United States Patent [19]
Scheinert et al.

[11] Patent Number: 5,863,178
[45] Date of Patent: Jan. 26, 1999

[54] EXHAUST TURBOCHARGER FOR INTERNAL COMBUSTION ENGINES

[75] Inventors: Helmut Scheinert, Ebersbach; Siegfried Sumser, Stuttgart, both of Germany

[73] Assignee: Daimler-Benz AG, Germany

[21] Appl. No.: 972,329

[22] Filed: Nov. 18, 1997

[30] Foreign Application Priority Data

Nov. 18, 1996 [DE] Germany ................ 196 47 605.4

[51] Int. Cl.$^6$ ................ F01D 1/12; F03B 1/00
[52] U.S. Cl. ................ 415/58.4; 415/914
[58] Field of Search ................ 415/58.2, 58.3, 415/58.4, 145, 914; 417/407

[56] References Cited

FOREIGN PATENT DOCUMENTS

| 15 03 512 | 2/1970 | Germany. |
|---|---|---|
| 2 220 447 | 6/1989 | United Kingdom. |

OTHER PUBLICATIONS

"Die Bibliothek der Technik Band 103 "Abgasturbolader— Michael Mayer pp. 20–25

Primary Examiner—John E. Ryznic
Attorney, Agent, or Firm—Evenson, McKeown, Edwards & Lenahan, P.L.L.C.

[57] ABSTRACT

A sleeve slidable along an axial direction of the impeller shaft produces a variable width of the channels leading into and out of the bypass. The sleeve can be a single unit, a telescopic slide, or a slide of two relatively movable parts.

14 Claims, 2 Drawing Sheets

EXHAUST TURBOCHARGER FOR INTERNAL COMBUSTION ENGINES

BACKGROUND AND SUMMARY OF THE INVENTION

This application claims the priority of German patent document 196 47 605.4, the disclosure of which is expressly incorporated by reference herein.

The invention relates to an exhaust turbocharger for internal combustion engines.

Exhaust turbochargers of the generic type are known. As a centrifugal-compressor map stabilizing measure, along the contour of the compressor impeller, approximately in the first quarter of the length of the impeller, parallel to the intake duct, a bypass is provided within the compressor housing in the form of an annular gap. The bypass is composed of a radial inlet groove located upstream from the compressor impeller, a radial contour groove located downstream from the inlet edge of the compressor impeller, and an annular chamber connecting these two grooves. The annular gap located parallel to the intake channel (and hence parallel to the inlet to the impeller itself) produces bypass mass flows which, in the area of the surge line, (that is, in the area of minimal volume flow delivery) and in the area of the plug limit (the area of maximum volume flow delivery), permit a shift toward smaller and/or larger volume flows by comparison with machines of the same design without a bypass.

The advantageous and desirable centrifugal-compressor map expansion thus achieved is attained at the expense of disadvantages in efficiency that are reflected in a disturbing higher noise level. For this reason, the object of the invention is to avoid these disadvantages while retaining the desired centrifugal-compressor map expansion.

According to the invention, this is accomplished by providing an exhaust turbocharger with a bypass which stabilizes the centrifugal compressor map. The bypass has a variable effective cross section, which is preferably set to an optimum width only in those areas of the centrifugal-compressor map field of the compressor that are near the surge line and/or the plug limit of the compressor. In other words, the bypass has an optimized cross section, but can be closed in between.

For this purpose, it may be advantageous within the scope of the invention to provide the inlet groove and/or the contour groove with variable widths, preferably to make them closable.

As a sealing element, an annular slide can be provided, which can be made in several parts, so that both grooves can be covered by telescopic adjustment.

Other objects, advantages and novel features of the present invention will become apparent from the following detailed description of the invention when considered in conjunction with the accompanying drawings.

DETAILED DESCRIPTION OF THE DRAWINGS

Figure 1:
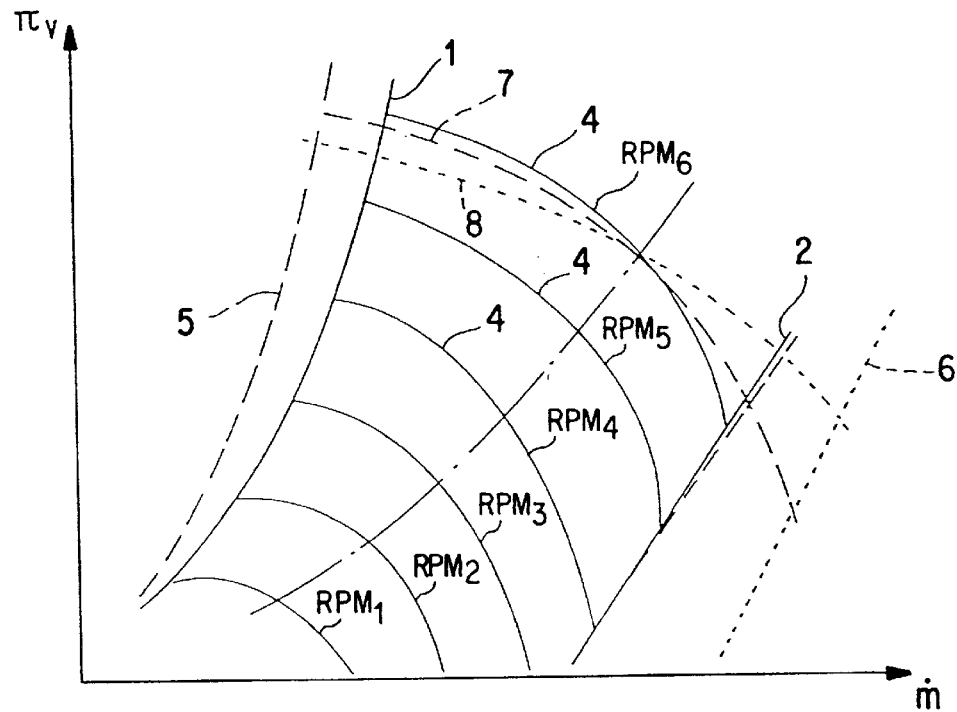
FIG. 1 shows a schematic view of a centrifugal-compressor map.

In the centrifugal-compressor map shown in FIG. 1, the mass throughput m is plotted as a function of the total pressure ratio $\pi_v$ that results on the compressor side from the ratio of the outlet pressure to the inlet pressure. In this case, the operating range of a conventional compressor is limited by curves 1 and 2, with curve 1 representing the surge line of the compressor, namely the minimum possible volume delivery with the compressor, and curve 2 shows the plug limit, in other words the maximum possible volume delivery for the compressor. Between curves 1 and 2, curves 4 for constant rpm are plotted, with the mass throughput likewise increasing with rpm.

An expansion of this centrifugal-compressor map in the form of an outward displacement of the surge line as well as the plug limit is shown schematically, dashed for the surge line (curve 5), and dotted for the plug limit curve 6, and in each case in conjunction with a correspondingly flatter curve for the constant rpm curves 7 and 8, with the latter only being plotted in comparison to the centrifugal-compressor map for the uppermost rpm. Such widening of the centrifugal-compressor map is achieved by a bypass arrangement like that described in greater detail with reference to FIG. 2.

Figure 2:
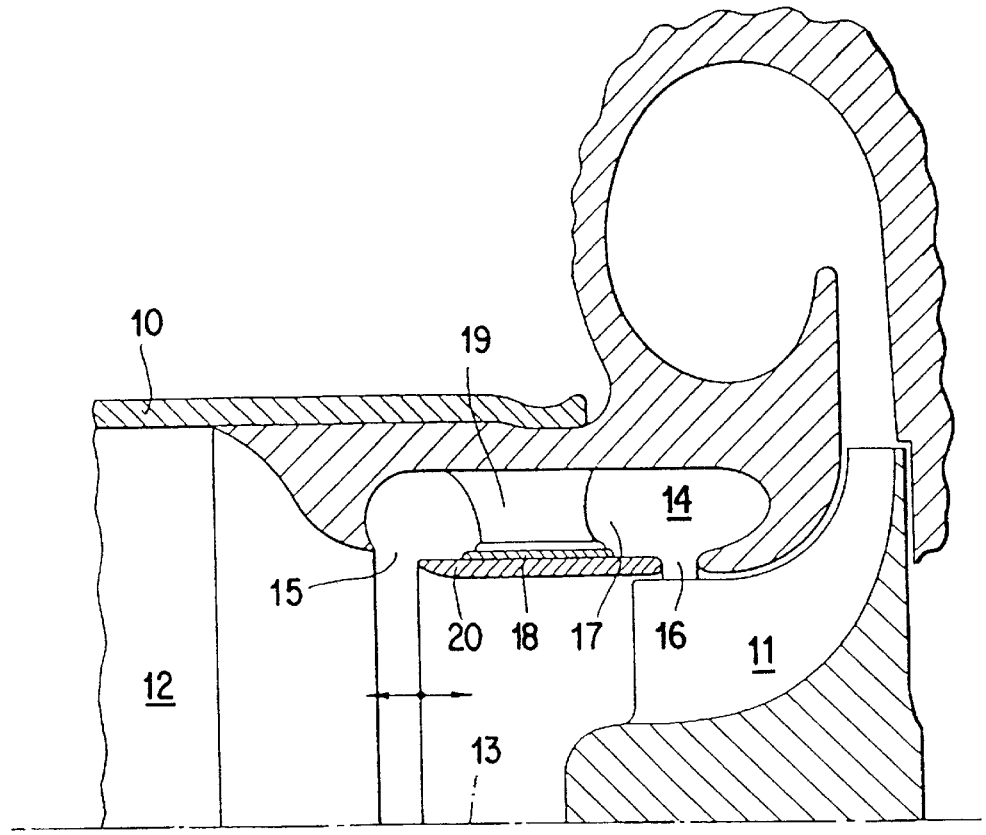
FIG. 2 shows a schematic section through the compressor part of an exhaust turbocharger.

In FIG. 2, the compressor part of an exhaust turbocharger is shown schematically. The compressor housing 10 has an intake channel 12 running axially. Compressor impeller 11 has an axial inlet and a radial outlet, and is driven by the coaxially located turbine wheel of the exhaust turbocharger (not shown). Moreover, the compressor is designed to be essentially symmetrical with respect to axis 13 of compressor impeller 11 shown by dot-dashed lines. For this reason, the diagram could be limited to one half of the compressor.

A bypass 14 is associated with intake channel 12 at the transition to the intake area of the compressor impeller 11, which ends freely at least in the intake area with its blades relative to housing 10. The bypass is located concentrically with respect to the axis 13, and is in the form of a ring around compressor impeller 11; it consists specifically of a radial inlet groove 15, a radial contour groove 16, and an annular chamber 17 that connects the two grooves 15 and 16 and extends axially between grooves 15 and 16. Inlet groove 15 is located upstream of compressor impeller 11, contour groove 16 is located in the area overlapping compressor impeller 11 approximately in the first quarter of the length of the impeller, and annular chamber 17 is delimited from intake channel 12 between grooves 15 and 16 by an annular wall segment 18 the channel being held by ribs 19 against the rest of housing 10. This annular wall section 18 is shortened axially according to the invention to an average guide section, and the width of the grooves (inlet groove 15 and contour groove 16) is determined by a sliding sleeve 20 guided on annular wall section 18.

Figure 3:
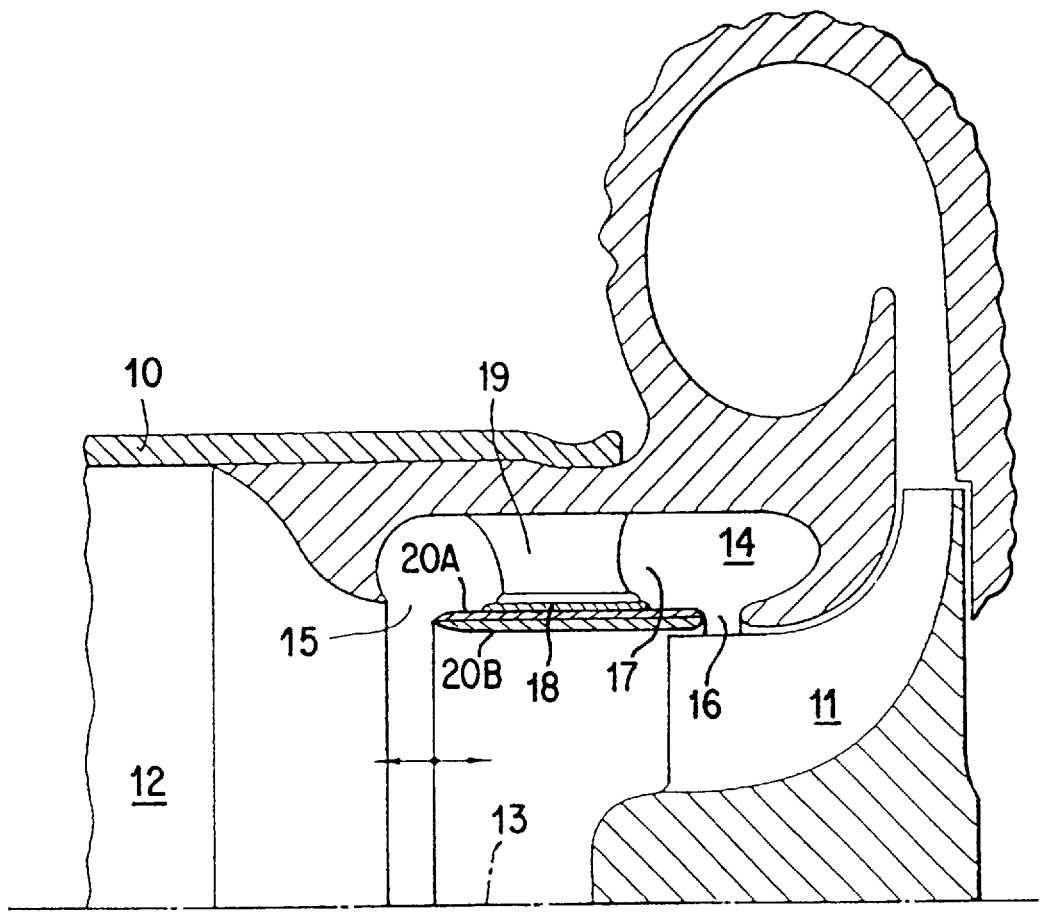
FIG. 3 shows a schematic section through the compressor part of an exhaust turbocharger according to another embodiment of the invention.

By axial displacement of sliding sleeve 20, the width of inlet groove 15 or of contour groove 16 can be changed as desired. If the sliding sleeve is made with double walls 20A, 20B, as shown in FIG. 3, it can be lengthened telescopically, and accordingly the groove widths can be modified independently of one another. With the telescope fully extended, both grooves can be closed. The same also can be done by dividing the sliding sleeve into two halves (not shown) and achieving corresponding axial displacement of the halves with respect to one another.

By using the basic configuration, namely a bypass 14, the centrifugal-compressor map shown in FIG. 1 can be widened.

The active mechanism is such that in the vicinity of the surge line, because of the pressures that develop there, air enters annular chamber 17 through contour groove 16 and passes through the corresponding annular volume in the direction of inlet groove 15, escaping through the latter into intake channel 12, and thus returning to the main mass flow ahead of the impeller inlet. The mass branched off in compressor impeller 11 therefore passes through the bypass volume opposite to the main flow direction, and thus has a damping action on pressure fluctuations that develop in the pump boundary area. As a result of the backflow and the resultant recirculating vortex, an increase in compressor throughput is achieved in the outer impeller blade area. This increase counteracts and reduces the separation tendency at relatively low total compressor throughput. Therefore, at the low compressor mass flows in question, flow separations caused by the excessively high improper flows against the outer blade areas are avoided.

In the vicinity of the plug limit there is a reverse flow direction. Inlet groove 15 and/or the free cross section determined by inlet groove 15, contour groove 16, and annular chamber 17 acts, in effect, as an increase in the compressor inlet area, so that the absorption capacity of the compressor is increased. In other words the plug limit is displaced toward higher throughputs. The disadvantages regarding efficiency associated with these measures, especially between the extreme ranges of the surge line and plug limit for the compressor are avoided because the widths of inlet groove 15 and/or contour groove 16 can each be changed by slide 20, both in terms of optimization within the surge line, as well as in regard to optimization in the plug limit area. They can also be completely closed, however, especially in the part of the centrifugal-compressor map located in between, so that deterioration of efficiency and increased noise caused by the grooves can be avoided. Characteristic measured values for a pump can be used as parameters for the respective setting of the groove widths, i.e. pressure, noise level, or critical fluctuations in these parameters, with an adaptive setting being advantageous.

In addition, control by means of a stored electronic centrifugal-compressor map adapted to the individual engine for the individual groove width can serve as a function of the respective engine operating point.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An exhaust turbocharger for an internal combustion engine, said turbocharger having a turbine and compressor, the compressor comprising:

a compressor housing;

a bladed compressor impeller which is driven by a turbine wheel exposed to an exhaust flow and is located in the compressor housing, said compressor impeller having an axial inlet proximate to an axial intake channel;

a radial inlet groove located in said axial intake channel upstream from the compressor impeller;

a radial contour groove located downstream from the inlet edge of the compressor impeller, in an area overlapping its inlet; and an annular chamber axially connecting the two grooves, said chamber being delimited from the intake channel by an annular rib that forms a part of the channel wall;

wherein at least one of the two radial grooves has a variable width.

2. Exhaust turbocharger according to claim 1 wherein at least one of the two radial grooves is closable.

3. Exhaust turbocharger according to claim 1 wherein the inlet groove has a variable width.

4. Exhaust turbocharger according to claim 2 wherein the inlet groove has a variable width.

5. Exhaust turbocharger according to claim 1 the contour groove has a variable width.

6. Exhaust turbocharger according to claim 2 the contour groove has a variable width.

7. Exhaust turbocharger according to claim 1 wherein a sealing element provided for at least one of said grooves is an axial annular slide.

8. Exhaust turbocharger according to claim 3 wherein a sealing element provided for at least one of said grooves is an axial annular slide.

9. Exhaust turbocharger according to claim 5 wherein a sealing element provided for at least one of said grooves is an axial annular slide.

10. Exhaust turbocharger according to claim 7 wherein the annular slide comprises several parts.

11. Exhaust turbocharger according to claim 10, wherein the annular slide is telescopic.

12. Exhaust turbocharger according to claim 5 wherein the annular slide forms an axial section of a wall of the intake channel between the two grooves.

13. Exhaust turbocharger according to claim 10 wherein the annular slide forms an axial section of a wall of the intake channel between the two grooves.

14. Exhaust turbocharger according to claim 11 wherein the annular slide forms an axial section of a wall of the intake channel between the two grooves.

* * * * *